United States Patent [19]

Paul

[11] Patent Number: 4,733,054

[45] Date of Patent: Mar. 22, 1988

[54] HOT FOOD STAND

[76] Inventor: Roger Paul, 2380 West Blood Rd., East Aurora, N.Y. 14052

[21] Appl. No.: 930,898

[22] Filed: Nov. 17, 1986

[51] Int. Cl.⁴ ............................................. H05B 1/02
[52] U.S. Cl. .................................. 219/358; 219/411; 219/521; 219/518; 219/385
[58] Field of Search .............. 219/358, 521, 518, 385, 219/386, 354, 405, 411; 200/85 R

[56] References Cited

U.S. PATENT DOCUMENTS

| | | | |
|---|---|---|---|
| 2,142,599 | 1/1939 | Binder | 219/518 |
| 2,526,447 | 10/1950 | Aiken | 200/85 R |
| 2,738,410 | 3/1956 | Ness | 219/518 |
| 3,315,064 | 4/1967 | Carlberg | 219/518 |
| 3,689,735 | 9/1972 | McLeod | 219/518 |
| 4,119,835 | 10/1978 | Losch | 219/358 |

*Primary Examiner*—E. A. Goldberg
*Assistant Examiner*—Teresa J. Walberg
*Attorney, Agent, or Firm*—Gilden & Israel

[57] ABSTRACT

A hot food stand utilizes heat lamps to keep food warm. The lamps are automatically activated when food is placed on a pressure sensitive support positioned beneath the lamps. A modified embodiment of the invention senses the quantity and positioning of food on the support and activates additional heat lamps if needed.

2 Claims, 3 Drawing Figures

HOT FOOD STAND

BACKGROUND OF THE INVENTION

1. Field of the Invention

The present invention relates to food warmers, and more particularly pertains to new and improved hot food stands which utilize heat lamps which are automatically activated when food is placed on supports beneath the lamps.

2. Description of the Prior Art

The use of food warmers is well known in the prior art. In this regard, restaurants frequently utilize enclosed or partially opened stands having heat lamps attached thereto, whereby food can be placed beneath the heat lamps thus to be kept warm until served. Unfortunately, the use of such heat lamps is extremely expensive, and no automatic means are provided for turning the lamps on and off as a function of need.

There has been the recognition of a need to automatically activate and deactivate a food heating element as a function of need. In this respect, reference is made to U.S. Pat. No. 4,214,150, which issued to D. Cunningham on July 22, 1980. The Cunningham device essentially comprises an electric heating element for the top panel of a cooking stove and has terminals adapted to be plugged into a terminal block carried by the stove panel. Means are provided for automatically interrupting current flow to the heating element when a cooking utensil is removed therefrom. Such means for automatically interrupting the current flow comprises a weight responsive switch having at least one contact in the terminal block. While being functional for its intended use, it can be appreciated that the Cunningham assembly is not designed and adaptable for use in combination with a hot food stand.

As such, there appears to be a continuing need for new and improved food warmers utilizable in restaurants, and the like, wherein such food warmers would employ the use of heat lamps and further wherein such lamps would automatically be activated and deactivated as needed. In this respect, the present invention substantially fulfills this need.

SUMMARY OF THE INVENTION

In view of the foregoing disadvantages inherent in the known types of food warmers now present in the prior art, the present invention provides an improved hot food stand utilizing heat lamps which are automatically activated and deactivated as a function of need. As such, the general purpose of the present invention, which will be described subsequently in greater detail, is to provide new and improved hot food stands which have all the advantages of the prior art hot food stand and none of the disadvantages.

To attain this, the present invention essentially comprises a partially enclosed hot food stand having a plurality of heat lamps mounted along a top surface thereof. The heat lamps radiate heat downwardly over a support plate, with this plate being designed to retain food which a user of the stand desires to keep warm until it is served. The support plate is mounted over a pressure sensitive normally open switch, thus to open the heating lamp circuit when the support plate is in an upwardly raised position. The placing of food on the plate causes a closing of the switch, thus to activate the heat lamps in a now apparent manner.

A modified embodiment of the invention utilizes a plurality of pressure sensitive switches mounted under a support plate. Each switch is activated at a different sensed pressure with a plurality of heating lamps each being activated by one of the switches. Accordingly, with this embodiment of the invention, a first quantity of food placed upon the support plate will close only one of the switches, thus to activate a first heat lamp. If additional food is placed upon the support plate, an additional switch is closed to thus activate a further heating lamp. As such, the lamps are utilized only when needed and in a quantity required to accomplish their desired function.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved food warmer which has all the advantages of the prior art food warmers and none of the disadvantages.

It is another object of the present invention to provide a new and improved food warmer which may be easily and efficiently manufactured and marketed.

It is a further object of the present invention to provide a new and improved food warmer which is of a durable and reliable construction.

An even further object of the present invention is to provide a new and improved food warmer which is susceptible of a low cost of manufacture with regard to both materials and labor, and which accordingly is then susceptible of low prices of sale to the consuming public, thereby making such food warmers economically available to the buying public.

Still yet another object of the present invention is to provide a new and improved food warmer which provides in the apparatuses and methods of the prior art some of the advantages thereof, while simultaneously overcoming some of the disadvantages normally associated therewith.

Still another object of the present invention is to provide a new and improved food warmer which utilizes a pressure sensitive switch to activate a heating lamp associated therewith.

Yet another object of the present invention is to provide a new and improved food warmer which utilizes a plurality of selectively activated pressure sensitive switches which individually operate to actuate a plurality of separate heating lamps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
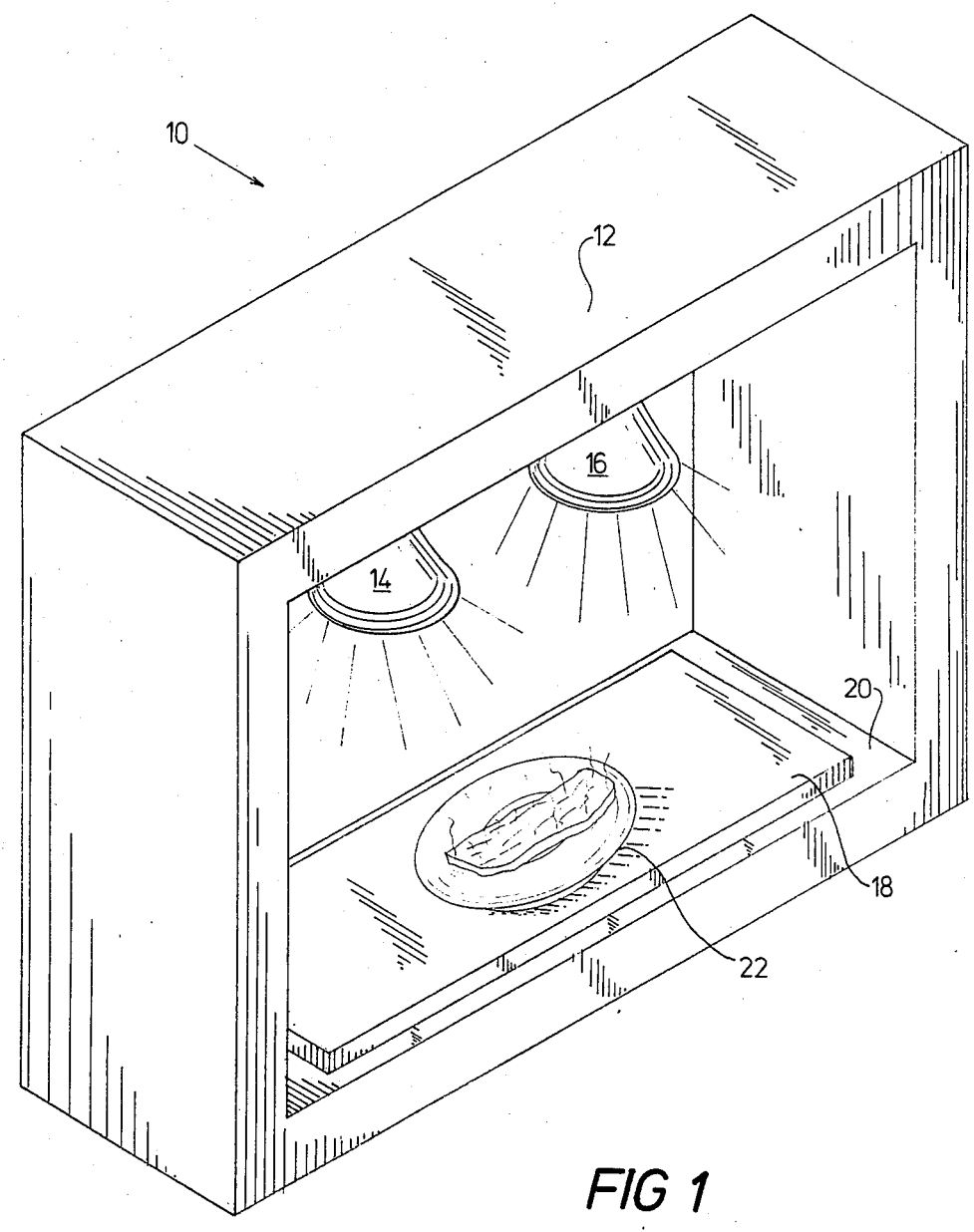
FIG. 1 is a perspective view of the hot food stand comprising the present invention.

With reference now to the drawings, and in particular to FIG. 1 thereof, a new and improved hot food stand embodying the principles and concepts of the present invention and generally designated by the reference numeral 10 will be described.

More specifically, it will be noted that the hot food stand 10 essentially comprises a rectangularly shaped housing 12 having an interior compartment with a plurality of heat lamps 14, 16 being mounted to a topmost interior portion thereof. The heat lamps 14, 16 are of a conventional design and utilize electric power to generate and radiate heat downwardly within the housing. As further illustrated in FIG. 1, a bottommost portion of the interior chamber includes a support plate 18 which is movably positioned on a floor portion 20 of the housing 12. The support plate 18 is designed to support containers of food and the like, such as a food plate 22. Typically, the hot food stand 10 would be utilized in a restaurant and is designed to keep a plate 22 of food warm until delivery to a waitress for serving to a customer.

Figure 2:
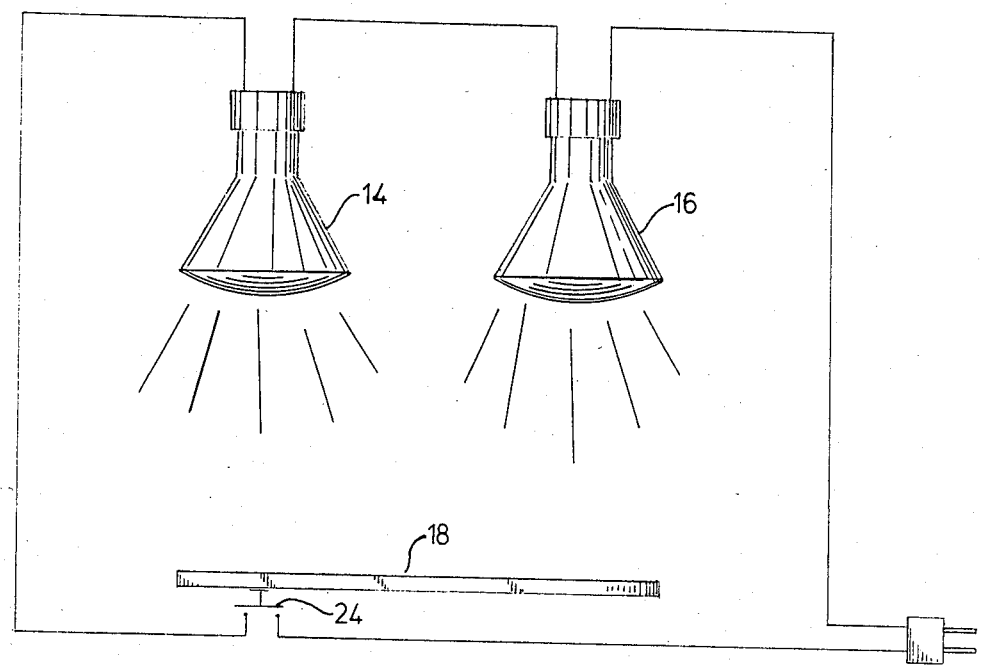
FIG. 2 is a schematic diagram of a first electrical circuit associated with the invention.

Recognizing that the use of heating lamps 14, 16 is extremely expensive due to their substantially large power consumption, the present invention is directed to the automatic activation of the lamps as a function of need. In this regard, reference is made to FIG. 2 of the drawings wherein an electrical schematic of a first embodiment of the invention is provided. As illustrated, it can be seen that the support plate 18 may be mounted over and abut against a normally open switch 24. The switch 24 is in series connection with the heating lamps 14, 16, whereby when the switch is in its normally open condition, no electrical power is delivered to the lamps.

With respect to the manner of usage and operation of this first embodiment of the invention, it can be seen that a positioning of food or some other material possessing weight upon the support plate 18 will result in its flexible or otherwise downward movement against the normally opened switch 24. A sufficient sensed weight will effect a closing of the switch 24, thereby to close the electrical circuit associated with the lamps 14, 16, thus to turn the lamps on and provide heat to the material positioned upon the support plate 18.

As can be appreciated, where a plurality of heating lamps 14, 16 are utilized, it may be necessary to only utilize one of the lamps at a time depending upon the quantity or location of food positioned upon the support plate 18. Where a support plate 18 is of an elongated construction as shown in FIG. 1, it might be desirable to heat only one end of the plate when food is placed on that end, while leaving the lamp associated with the opposed end of the plate in a deactivated position.

Figure 3:
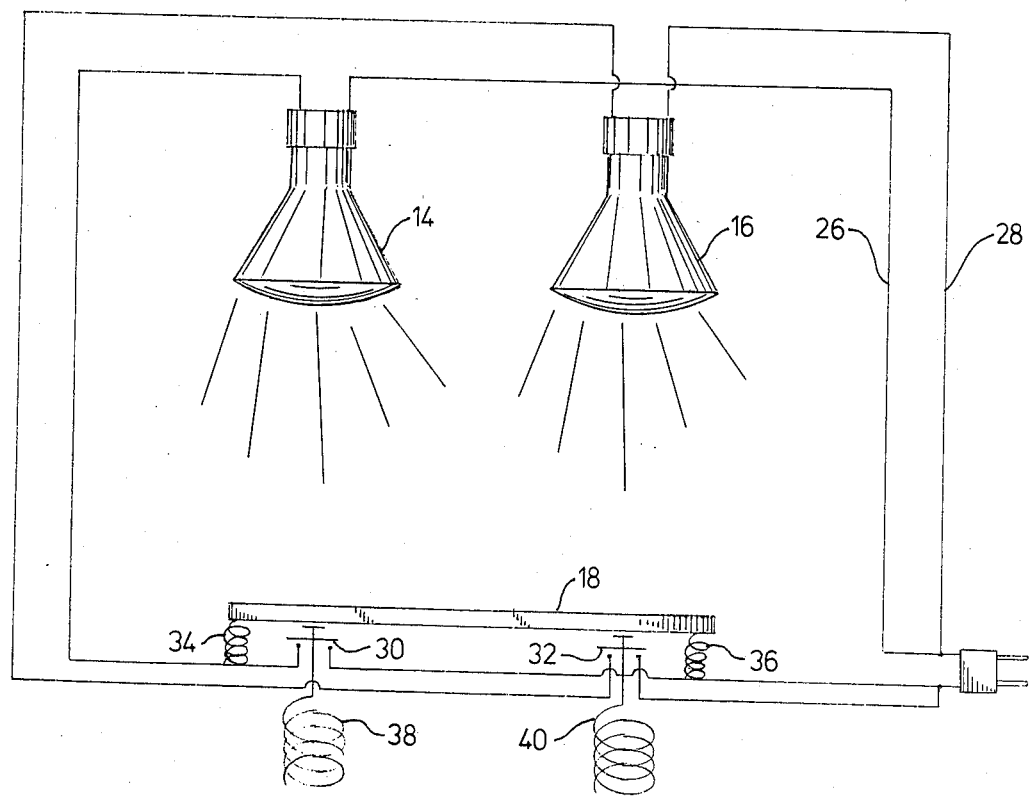
FIG. 3 is a schematic illustration of a second electrical circuit utilizable in conjunction with the invention.

FIG. 3 of the drawings illustrates an electrical circuit which addresses the need for selective heating along a support plate 18. As shown in this embodiment of the invention, the heating lamps 14, 16 are no longer in series electrical connection, but are rather paralleledly connected with a first electrical conductor 26 supplying electricity to the heating lamp 14 and a second electrical conductor 28 supplying electricity to the heating lamp 16. With further reference to the FIG. 3 drawing, it will be noted that the support plate 18 is mounted over respective normally open pressure sensitive switches 30, 32. The support plate 18 is retained in an extended position above the switches 30, 32 by support springs 34, 36. These support springs 34, 36 are representative of any flexibly movable supports which would allow a downward movement of the support plate 18 into contact with the switches 30, 32 as a result of a sensed pressure upon the plate.

The switches 30, 32 are of a spring-biased construction with respective springs 38, 40 being operable to hold the switches in their normally open state. The spring constants of the springs 38, 40 or, alternatively, of the springs 34, 36 can be varied so that their rate of compression differs as a function of an applied weight.

With respect to the manner of usage and operation of this second embodiment of the invention, it will be noted that the pressure sensitive switch 30 functions to control the flow of electricity to the heating lamp 14, while the pressure sensitive switch 32 controls the flow of electricity to the heating lamp 16. If a plate of food is placed on the left end of the support plate 18, the springs 34, 38 will sense a greater pressure than the springs 36, 40, which then results in a closing of the switch 30 while the switch 32 remains open. As such, only the heating lamp 14 is activated over the food placed on the left end of the plate 18. If a further plate of food is then placed on the right end of the support plate 18, sufficient pressure will now be available against the switch 32 to effect its closing, thus to activate the heating lamp 16, thereby to provide an increased heating effect within the hot food stand 10. A subsequent removal of the plate of food on the left end of the plate 18 will result in a deactivation of the heating lamp 14, while the heating lamp 16 remains lit, and a subsequent removal of the food on the right end of the end of the plate will result in the deactivation of the heat lamp 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hot food stand, comprising:
   a. housing means;
   b. support plate means mounted on a floor portion of said housing means and being operable to support a quantity of food positioned thereon;
   c. a plurality of heating lamps mounted in a topmost portion of said housing means, said heating lamps serving to radiate heat downwardly on said food, thereby to effect a warming thereof;
   d. a plurality of pressure sensitive switches, said switches being normally retained in an open condition by spring biasing means, said spring biasing means including individual springs for each of said plurality of pressure sensitive switches, each of said springs having different spring constants to thus vary a pressure required to close each of said switches, a first of said switches when closed activating a first of said plurality of heating lamps as a result of food being placed at a first end of said support plate means, a second of said switches when closed activating a second of said plurality of heating lamps as a result of food being placed at a second end of said support plate means.

2. A hot food stand, comprising:
   a. housing means;
   b. support plate means mounted on a floor portion of said housing means and being operable to support a quantity of food positioned thereof;
   c. a plurality of heating lamps mounted in a topmost portion of said housing means, said heating lamps serving to radiate heat downwardly on said food, thereby to effect a warming thereof;
   d. a plurality of pressure sensitive switches, said switches being normally retained in an open condition, a first of said switches when closed activating a first of said plurality of heating lamps as a result of food being placed at a first end of said support plate means, a second of said switches when closed activating a second of said plurality of heating lamps as a result of food being placed at a second end of said support plate means;
   e. spring means for mounting said support plate means thereon, said spring means including a plurality of individual springs with each of said springs having different spring constants, whereby a first end of said support plate means will move downwardly at a different rate than a second end of second support means, thus to close individual ones of said plurality of pressure sensitive switches at different times and depending upon a sensed pressure upon said plate means.

* * * * *